United States Patent [19]
Lenhard

[11] 3,869,612
[45] Mar. 4, 1975

[54] COPY APPARATUS WITH MEANS TO EFFECT VISIBLE RAY IMAGING AND INFRARED RAY TRANSFIXING

[75] Inventor: Myron J. Lenhard, Penfield, N.Y.

[73] Assignee: Xerox Corporation, Stamford, Conn.

[22] Filed: Dec. 28, 1973

[21] Appl. No.: 429,250

[52] U.S. Cl............ 250/319, 101/DIG. 13, 101/470
[51] Int. Cl. ............................................ G01n 21/34
[58] Field of Search ........... 250/316, 317, 318, 319; 101/470, DIG. 13; 355/3 DD, 16

[56] References Cited
UNITED STATES PATENTS

| | | | |
|---|---|---|---|
| 3,397,630 | 8/1968 | Pratt | 250/319 |
| 3,447,872 | 6/1969 | Pfaff | 250/319 |
| 3,623,869 | 11/1971 | Allard | 250/316 |

Primary Examiner—James W. Lawrence
Assistant Examiner—D. C. Nelms

[57] ABSTRACT

An original and heat sensitive member are exposed to a tungsten lamp rays to form a heat image on the heat sensitive member. During this exposure, a dichroic filter is in the ray path to filter out a substantial amount of infrared rays but allow visible rays to pass therethrough effecting a broader range of heat imaging a colored original. The image is developed with carbon black containing toner particles and a copy sheet and the developed heat sensitive sheet are exposed to the same ray path of the same lamp only with the filter removed to allow the infrared and visible rays to heat the toner particles for transfixing the same to the copy sheet. If desired, the toner particles can be fused to the heat sensitive sheet rather than transfixing the same to a copy sheet.

6 Claims, 3 Drawing Figures

COPY APPARATUS WITH MEANS TO EFFECT VISIBLE RAY IMAGING AND INFRARED RAY TRANSFIXING

DESCRIPTION OF THE INVENTION

In most thermographic copying systems a tungsten lamp is utilized to heat an original member in contact with a heat sensitive member in order to form a heat image on the heat sensitive member. With such a lamp, it is difficult to obtain a copy of images which absorb mostly (at least 90 percent) in the visible when they appear on an original either alone or along with infrared absorbing images. An example of the latter is a signed typewritten letter wherein the type is of infrared absorbing carbon black while the signature could be made with ink absorbing mostly in the visible such as a black or blue ball point or felt pen. The difficulty is due to the fact that a tungsten lamp emits much more energy in the infrared range than in the visible range. For instance, a tungsten lamp at 2500° Kelvin has about 95 percent of its energy in the infrared and about 5 percent of its energy in the visible. A tungsten lamp heated to 3300° Kelvin has about 85% of its energy in the infrared and about 15 percent of its energy in the visible. Thus the amount of heat absorbed by an infrared absorbing image from the tungsten lamp will be much greater than that absorbed by a visible ray absorbing image. If the energy is such that the visible ray absorbing image absorbs sufficient visible rays for heat imaging, then the infrared absorbing image usually absorbs too much infrared and visible rays and becomes too hot and a "balooning" effect takes place on the heat sensitive sheet. The term balooning refers to each character of an image increasing in size due to the heat being transferred to the heat sensitive member which results in distorted characters and in many cases even overlapping of characters. If the image is mostly visible absorbing, then the original paper in background areas may absorb sufficient infrared to activate the heat sensitive member in background areas causing a loss of definition between the image and background areas. If a sufficient amount of infrared rays are filtered out so the ratio of infrared energy to visible energy emanating from the lamp for imaging is significantly reduced, the amount of heat absorbed by an infrared absorbing image or background on an original as compared to an image absorbing mostly in the visible is also significantly reduced. For instance, the ratio of energy (infrared and visible) can be reduced to the extent which will allow sufficient heat to be absorbed by the inks on an original which absorb mostly in the visible for reproduction thereof while still retaining sharp characters in the reproduction of the carbon black images on the same original or without the background absorbing an unduly amount of infrared rays. Thus, this will allow reproduction of a broader range of colored images on an original.

After a heat image is formed on the heat sensitive member, it is developed with infrared and visible absorbing developer material which will utilize the total energy emanated by the tungsten lamp to either fuse the same to the heat sensitive material or to transfix (transfer and fuse) the same to a copy sheet.

It is an object of this invention to utilize the same tungsten lamp for reproducing an original image by effecting a heat image thereof on a heat sensitive member utilizing a significantly reduced energy ratio of infrared to visible and for fusing a developed image onto the heat sensitive member or effecting transfixing of a developed image from the heat sensitive member to a copy sheet utilizing a substantially increased amount of infrared energy compared to the infrared energy utilized during the imaging function.

Another object of this invention is to utilize the above object to reproduce copies of originals which contain non-carbon black or blue inks.

It is an overall object of this invention to fulfill the above objects by providing a dichroic filter which will be in position to filter out a substantial amount of infrared rays of the tungsten lamp during the heat imaging function and which is withdrawn to allow infrared and visible rays to perform the fusing or transfixing function.

Other objects of this invention will become apparent from the following description with reference to the drawing wherein.

Figure 1:
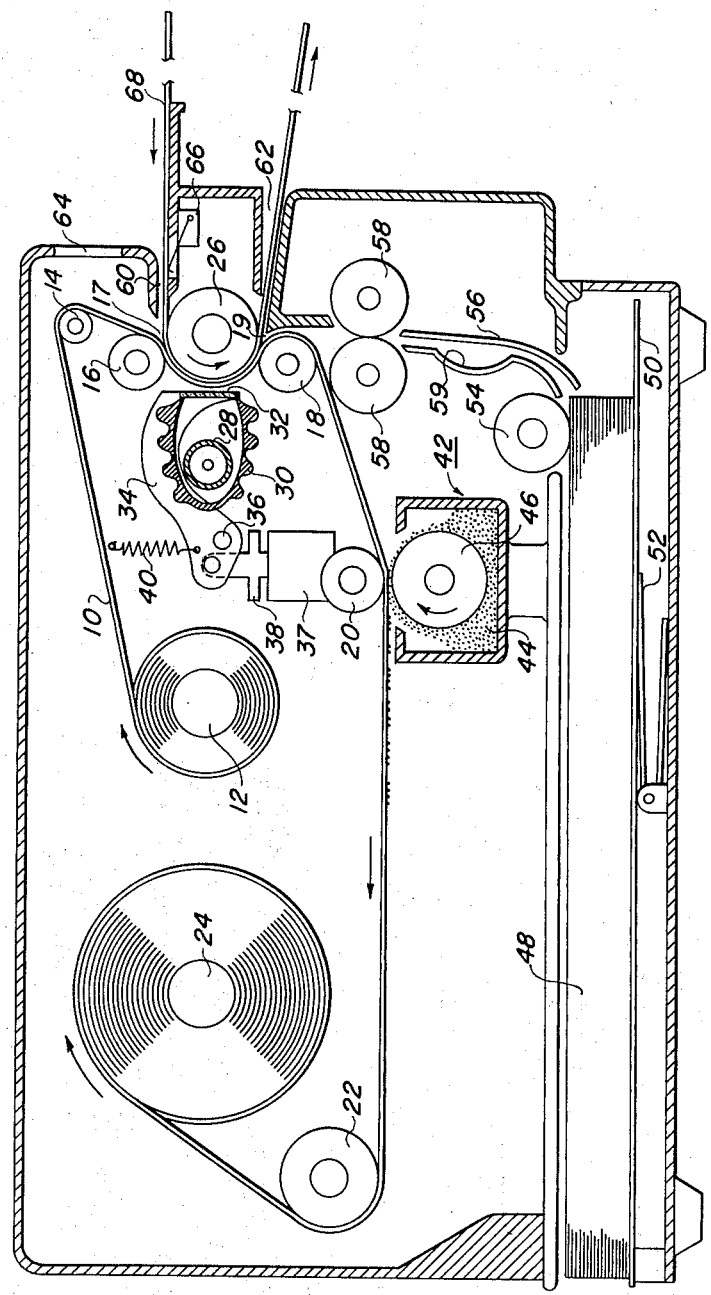
FIG. 1 is a general schematic view of a copying apparatus during an imaging and developing function.

Referring to FIG. 1, a web of heat sensitive material 10 is fed from a supply spool 12 around idler rolls 14, 16, 18, 20 and 22 to a take-up spool 24. The web 10 for practical purposes may be considered transparent to infrared and comprises a support with a heat sensitive coating. For example, the support may be paper or an organic film such as a polyester film, cellulose acetate or triacetate film coated with a delayed tack adhesive which is normally hard and non-tacky at room temperature, but which, upon being activated by heat to a tacky condition and subsequently cooled to room temperature, thereafter remains tacky for considerable periods of time varying from at least 30 seconds to several days or more depending upon the particular composition involved. Such delayed tack coatings are well known and can be a mixture of discrete particles of resin such as indene resin or esterfied resin and discrete particles of crystalline plasticizer such as diphenyl phthalate or N-cyclohexyl paratoluene sulfonamide. The particles are bound together into the supporting film by a binder such as styrene-butadiene copolymer. Generally speaking, the crystalline plasticizer component of the mixture is in excess of the resin component.

The supply spool 12 and the take-up spool 24 are connected through a respective slip clutch (not shown) to a reversible motor (not shown). The clutch connection for the supply spool 12 is such that the spool will be positively driven in a counterclockwise direction and slips to allow the spool to rotate in a clockwise direction. The clutch connection for the take-up spool 24 is such that the spool will be positively driven in a clockwise direction and slips to allow the spool to rotate in a counterclockwise direction. A rotatable cylinder 26 having a highly reflective surface, which may be reversibly driven, is interposed between the idler rolls 16 and 18 and is so arranged that the web 10 is pressed against the idler rolls to form nips 17 and 19. A tungsten lamp 28 is located opposite the cylinder 26 and a reflector 30 is arranged to focus the rays of the lamp 28 onto the cylinder 26 between the idler rolls 16 and 18.

Figure 3:
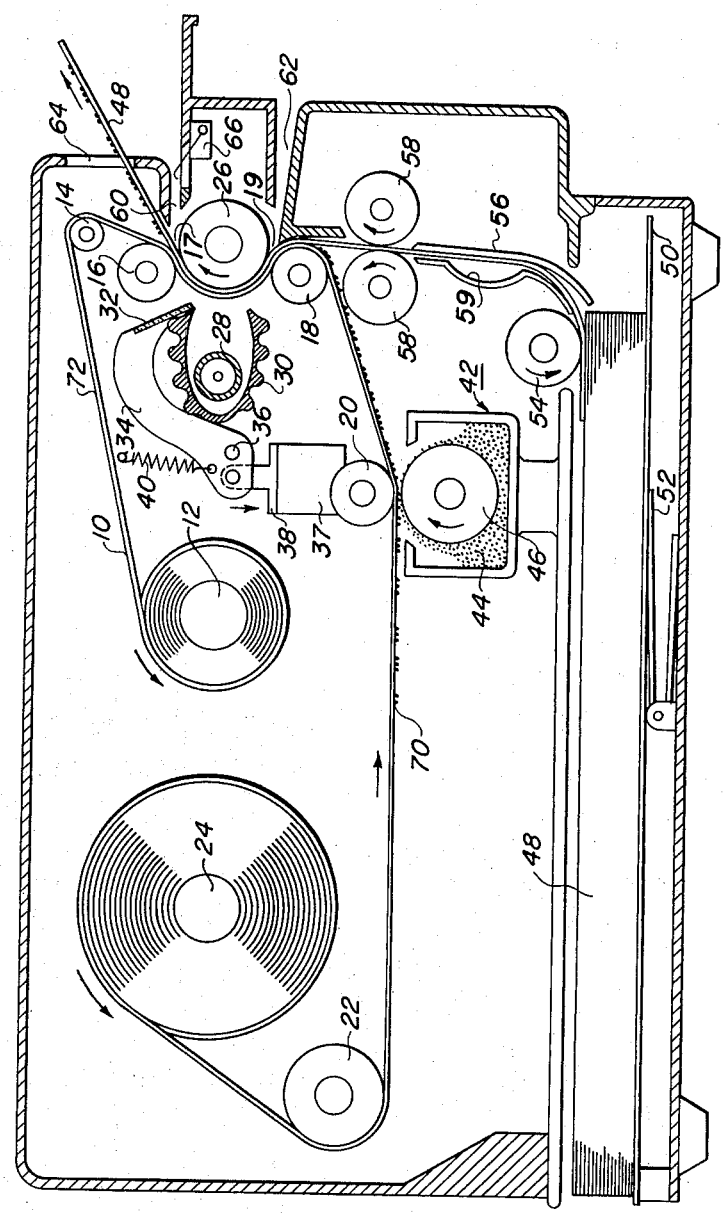
FIG. 3 is a view of the copying apparatus of FIG. 1 during transfer of a developed image to a copy medium.

A dichroic filter 32 is fixed to one end of a lever arm 34 which is pivotally mounted by a pin 36 to the main frame of the copying apparatus. A solenoid 37 has a plunger 38 pivotally connected to the other end of the lever arm 34 and a spring 40 is fixed at one end to the lever arm 34 and at the other end to the frame of the copying apparatus to urge the lever arm in a clockwise rotational direction about the pivot pin 36 wherein the filter 32 is interposed between the cylinder surface 26 and the lamp 28 for filtering out infrared energy. The solenoid plunger 38 is arranged that upon actuation of the solenoid the plunger is moved downwards from the position shown in FIG. 1 to the position shown in FIG. 3 to create a counter rotational force upon the lever 34 and remove the filter 32 from between the lamp 28 and the surface of the cylinder 26 whereby infrared energy being transmitted by the lamp 28 will be passed to the surface 26.

The dichroic filter is well known and can be designed to perform a function depending upon the results desired as well as conditions involved. The filter 32 should be designed to filter out sufficient infrared and allow substantially all visible rays to pass therethrough to significantly reduce the energy ratio of infrared to visible emanating from the lamp 28 to the extent that an image absorbing mostly (at least 90 percent) in the visible will absorb enough visible rays to form a corresponding heat image on the heat sensitive sheet without any infrared absorbing image becoming too hot to form a corresponding distorted heat image on the heat sensitive sheet or the background areas of the original becoming too hot to melt the heat sensitive sheet in corresponding areas. It should be recognized that a given available energy ratio of infrared to visible can result in an energy absorption ratio of carbon black to non-carbon ink (black or blue) which is substantially lower than the energy absorption ratio of carbon black to other non-carbon inks. This means that a non-carbon black or blue ink can be copied much easier and produce much better copies than other non-carbon inks. This, however, would cover most originals with signatures since either blue or black ink is utilized for signatures. Obviously, the lamp must be emanating sufficient visible energy to effect a heat image by the mostly visible absorbing images. A tungsten lamp operating at 3300° Kelvin is usually sufficient for imaging.

A developing station is provided which comprises a developer housing 42 having a bed of ferromagnetic toner particles 44 therein. A well known magnetic brush 46 is provided for presenting toner particles 44 to the image passing thereacross.

The toner particles 44 comprise thermoplastic particles pigmented with carbon black or other infrared absorbing dyes or pigments and mixed with iron oxide particles. Preferably the toner particles will absorb both in the infrared and visible.

A stack of copy sheets 48 is located on a paper tray 50. The stack of sheets are urged by a torsion spring 52 against a paper feed roll 54. The paper feed roll 54 drives the uppermost sheet of the stack along a guide 56 to a pair of nip rolls 58 which receive the leading edge of the copy sheet therein. At the proper time, the nip rolls 58 are actuated to drive the copy sheet to the nip 19. A storage recess 59 is provided in the guide 56 to allow the sheet to buckle until the nip rolls 58 are actuated.

Figure 2:
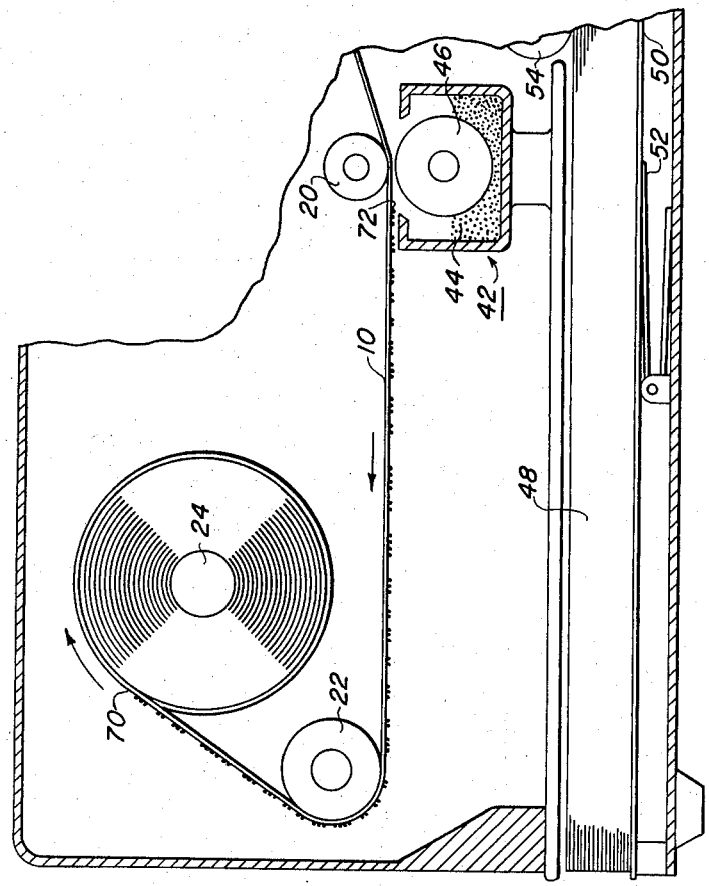
FIG. 2 is a partial view of the copying apparatus of FIG. 1 illustrating the position of a web after an image thereon has been developed.

An original inlet slot 60 is provided which opens adjacent the nip 17 and an original outlet slot 62 is provided adjacent the nip 19. A copy outlet opening 64 is provided which is also adjacent the nip 17. A microswitch 66 is provided in the original inlet opening 60 which, when actuated, serves to actuate a control mechanism (not shown) which performs the following operation:

Referring to FIG. 1, an original sheet 68 bearing an image absorbing mostly in the visible and an infrared absorbing image thereon is fed into the inlet slot 60 actuating the switch 66 which sets in motion rotation of the cylinder 26 and the web supply roll 12 and the web take-up roll 24 and the magnetic brush 46 in the direction of the arrows. Also, actuation of this switch 66 effects illumination of the lamp 28 which operates at 3300° Kelvin. The leading edge of the original sheet 68 is fed into the nip 17 and is moved with the web 10 past the lamp 28 and then the original separates from the web and is directed through the outlet opening 62. As the web and original pass the lamp 28, heat is absorbed by the image and transferred to the heat sensitive web 10 to form a tacky image corresponding to the image on the original sheet. The filter 32 is in position to significantly reduce the energy ratio of infrared to visible emanating from the lamp that can be absorbed by the image. As the web 10 and the original 68 pass around the cylinder 26, the sandwich is in tight engagement with the cylinder 26 assuring efficient heat transfer between the image and the heat sensitive layer. The web is transported past the magnetic brush 46 which presents toner particles to the web and develops the tacky image thereon. During development, the portion of the web passing the magnetic brush takes support on the idler roll 20 which assures that the toner particles presented by the magnetic brush will engage the web. The control system employs a camming mechanism which assures that the lamp 28 is illuminated for a sufficient time for the imaging process to be completed and then the lamp is turned off. Referring to FIG. 2, the camming mechanism also assures that a sufficient length of the web 10 corresponding to the length of the sheet to be copied passes at least the magnetic brush 46 before being stopped with a portion of the leading edge of the developed image being wrapped on the take-up roll 24 as a single layer only to avoid any smudging of the developed iamge. To illustrate this, the leading edge of the developed image is indicated by reference numeral 70 and the trailing edge is indicated by reference numeral 72.

After the web 10 has stopped, the control mechanism actuates the solenoid 37 to move the plunger 38 downwards to cause counterclockwise rotation of the lever arm 34 thereby withdrawing the filter 32 out of the path of the rays of the lamp 28. Also, the rotation of the supply roll 12, take-up roll 24, the magnetic brush 46 and the rotation of the cylinder 26 is reversed and the paper feed roll 54 is actuated to move the leading edge of the uppermost sheet of the stack 48 into engagement with the nip rolls 58. The web 10 starts its reverse movement past the magnetic brush 46 with the former trailing edge 72 now being the leading edge. As the leading edge 72 of the image moves toward the nip 19, the nip rolls 58 are actuated at the proper time to move the copy sheet 48 to the nip 19 so that the leading edge of the copy sheet 48 will align with the leading edge 72 of the image just prior thereto. The lamp 28 is illuminated just prior to the leading edge 72 of the developed image and the copy sheet entering the nip 19. The aligned copy sheet and the heat sensitive web are forwarded past the lamp 28 whereby the infrared rays therefrom heat the toner particles until a substantial portion of the toner particles become transfixed (transfer and become fixed) to the copy sheet to provide a reproduction of the original image. This transfer occurs due to the pressure between the web 10 and the copy sheet 48 effected as they travel around the cylinder 26 and effected at the nip 17 combined with a corresponding proper temperature. Since essentially the total energy output of the lamp 28 is available for the transfixing function, less power is needed than for imaging and thus the lamp may be operated at 2500° Kelvin. As the copy sheet 48 emerges from the nip 17, the sheet separates from the web 10 and is directed out of the machine through the slot 68. After the trailing edge of the copy sheet 48 has emerged from the nip 17, the lamp 28 is turned off, the solenoid 37 de-energized, the nip rolls 58 and the magnetic brush 46 stopped, and the rotation of the web supply roll 12 and the take-up roll 24 is reversed to move the used portion of the web 10 to a point where the trailing edge 72 of the last image formed on the web passes just beyond the nip 17 where the web is stopped in position for another copy to be made in the same manner as described above.

The control system and the components thereof for operating the machine in the manner described are all well known and well within the grasp of one having ordinary skill in the art and therefore have not been shown.

Since the imaging and developing function of the components of the machine is separate from the image transfer function, the speed at which the web 10 travels in reverse can be changed from the speed for the imaging and developing function depending upon the system designed.

While this machine has been described utilizing an automatic paper feeder, the machine also has utility where the copy sheet 48 is fed by hand into the machine. In this instance, a pair of nip rolls may be located in the slot 62 which rotate in one direction to withdraw the original from the machine and rotate in the opposite direction at the proper time to pull a copy sheet inserted into the slot 62 to meet the leading edge 72 of the web just prior to the nip 19 for the transfer and fixing of the toner powder image from the web to the copy sheet.

It should be further realized that the concept of this invention is also applicable to heat imaging heat sensitive members in sheet form rather than in web form. Furthermore, the image bearing heat sensitive sheet may be developed outside of the machine containing the image station. The imaging and transfixing station may also be utilized for fusing the toner particles onto the heat sensitive member rather than transfixing the same to a copy sheet. In this instance, the cylinder 26 would have to be of a material to which the toner particles will not stick when they are melted. Alternatively, a release sheet could be substituted for the copy sheets 48 and fed with the developed heat sensitive sheet past the lamp 28. The release sheet would be of a material to which the melted toner particles would not stick. All that is required is that the same station and lamp ray path be utilized for both imaging and transfixing or fusing of the developed image with a reduced energy ratio of infrared to visible being utilized for imaging and infrared rays being used for fusing or transfixing.

What is claimed is:

1. A copying apparatus comprising: a tungsten lamp for emanating energy at a high ratio of infrared to visible, a filter capable of allowing a substantial portion of visible rays emanated by said lamp to pass therethrough and for filtering a substantial amount of infrared rays to substantially reduce said energy ratio, means for energizing said lamp a first time when an original member having an image thereon to be copied and a heat sensitive member are at said station to form a heat image on said heat sensitive member, means for locating said filter in an operative position to be in the path of the rays emitted from said lamp when said lamp is energized said first time so that the heat sensitive member and said original member will be exposed to rays of said reduced energy ratio, means for energizing said lamp a second time when the heat sensitive member having a developed image thereon is at said ray path for heating the developed image, and means for withdrawing said filter from its operative position to allow said heat sensitive member to be exposed to visible energy and substantially more infrared energy when said lamp is energized the second time.

2. The structure as recited in claim 1 wherein means are provided to move the original member and the heat sensitive member as a sandwich across said ray path when the lamp is energized said first time and to move the heat sensitive member and a copy member as a sandwich across said ray path when the lamp is energized said second time to transfix the developed image to the copy member.

3. The structure as recited in claim 2 further comprising a developing station, means for transporting the heat sensitive member to the developing station and for returning the heat sensitive member to said ray path, and means for aligning the copy member with the developed heat sensitive member prior to entering said ray path.

4. The structure as recited in claim 3 further comprising a supply roll and a take-up roll, said rolls being so located that the heat sensitive member may extend across said ray path and through said station in web form with one end connected to said supply roll and the other end connected to said take-up roll.

5. The structure as recited in claim 1 further comprising a developing station, means for transporting the heat sensitive member to the developing station and for returning the heat sensitive member to said ray path.

6. The structure as recited in claim 5 further comprising a supply roll and a take-up roll, said rolls being so located that the heat sensitive member may extend across said ray path and through said stations in web form with one end connected to said supply roll and the other end connected to said take-up roll.

* * * * *